No. 856,379. PATENTED JUNE 11, 1907.
J. B. WIARD.
MEANS FOR COOLING ELECTRIC MOTORS.
APPLICATION FILED OCT. 16, 1906.

2 SHEETS—SHEET 1.

Witnesses:
Marcus L. Byng.
J. Ellis Glu.

Inventor:
John B. Wiard,
by Albert G. Davis, Atty.

No. 856,379. PATENTED JUNE 11, 1907.
J. B. WIARD.
MEANS FOR COOLING ELECTRIC MOTORS.
APPLICATION FILED OCT. 16, 1906.

2 SHEETS—SHEET 2.

Witnesses:
Marcus L. Byng.
J. Ellis Glen.

Inventor:
John B. Wiard,
by
Atty.

UNITED STATES PATENT OFFICE.

JOHN B. WIARD, OF LYNN, MASSACHUSETTS, ASSIGNOR TO GENERAL ELECTRIC COMPANY, A CORPORATION OF NEW YORK.

MEANS FOR COOLING ELECTRIC MOTORS.

No. 856,379.  Specification of Letters Patent.  Patented June 11, 1907.

Application filed October 16, 1906. Serial No. 339,156.

*To all whom it may concern:*

Be it known that I, JOHN B. WIARD, a citizen of the United States, residing at Lynn, county of Essex, State of Massachusetts, have invented certain new and useful Improvements in Means for Cooling Electric Motors, of which the following is a specification.

My invention relates to electric motors and particularly to an arrangement for keeping them cool.

In motors which have a wholly inclosed casing, so that they may be used in situations wherein it is desirable to have no communication between the interior of the motor and surrounding medium, as, for example, where they are to be operated while submerged, it is difficult to dissipate the heat generated so as to keep down the temperature.

The object of my invention is to prevent an objectionable rise in temperature in such motors, in a simple and reliable manner.

To the above end my invention consists in providing such motors with chambers having large superficial areas, through which chambers a cooling fluid may be passed, and arranging fans or other circulating means within the motor-casing for producing a circulation of the air within the casing. The air is thus made to flow continuously past the cores and windings of the motors and then across the surface of the cooling chambers where the heat taken up from the motor elements is given up to the cooling medium in the chambers.

Figure 1:
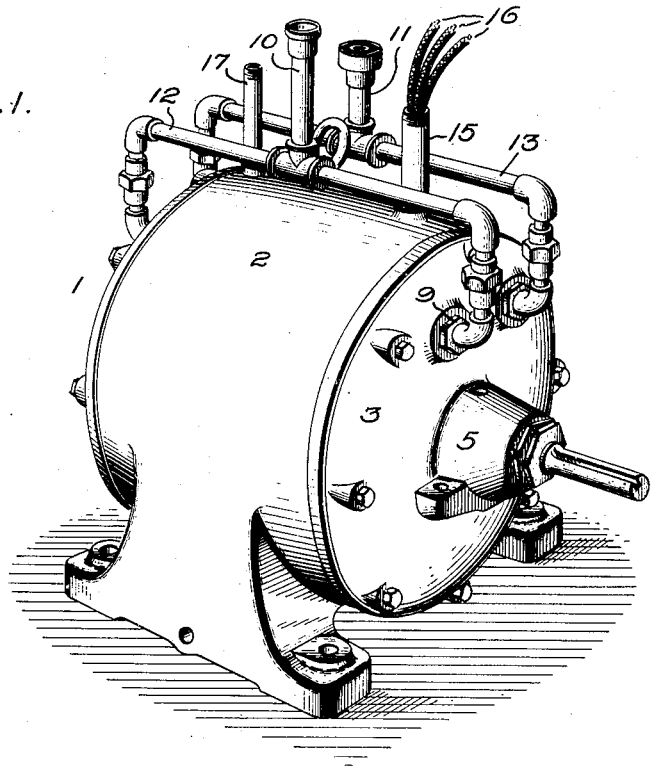
Figure 4:
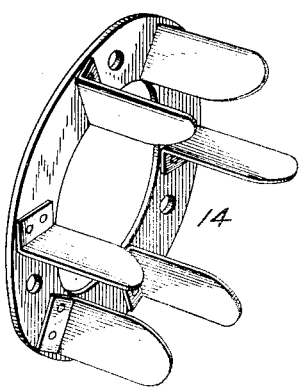
Figure 2:
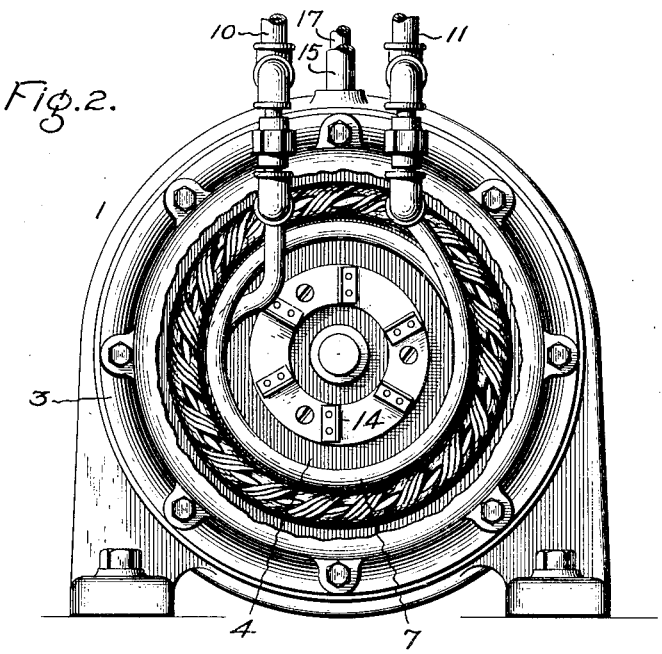
Figure 3:
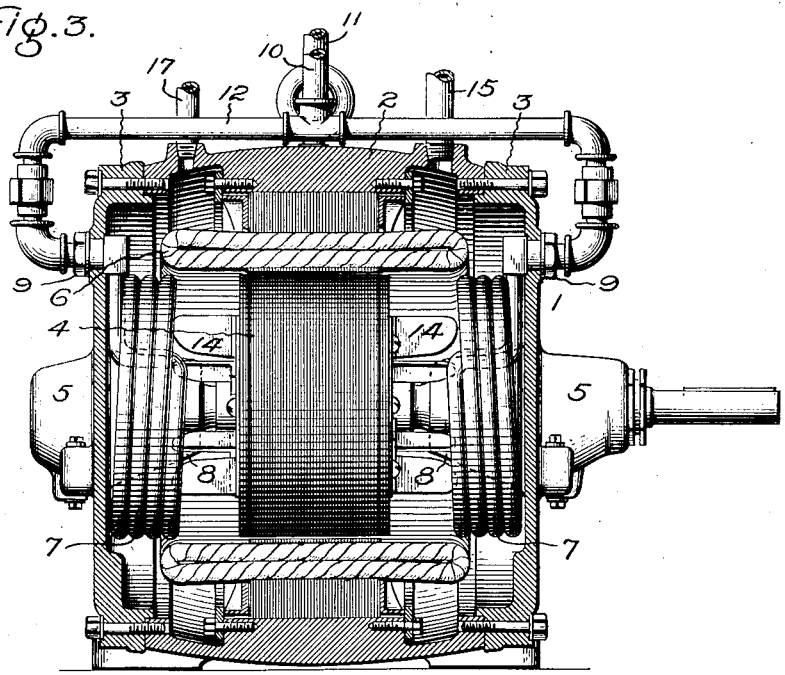

For a full understanding of my invention and of its various objects and advantages, reference is to be had to the following detailed description taken in connection with the accompanying drawings, wherein Figure 1 is a perspective view of a motor equipped in accordance with one form of my invention; Fig. 2 is an end elevation of the motor with a portion of the bonnet removed; Fig. 3 is a longitudinal cross-section of the motor; and Fig. 4 is a fan detail.

Reference being had to the drawing, 1 represents a motor frame consisting of a stator or field ring 2 and bonnets 3—3 secured to the ends of the stator or field ring. These bonnets form with the stator or field ring a totally inclosed structure within which the rotor or armature 4, carried upon a shaft which is journaled in bearings 5—5 on the bonnets, rotates. 6 indicates the stator winding. These parts may all take any usual or preferred forms since the motor need not be of any particular type. Within each bonnet is nested a helical tubular coil 7, preferably arranged concentric with the bearings 5 and surrounding the bearing boss 8 which projects into the interior of the motor; thus forming an annular chamber having a large superficial area at each end of the rotor or armature. The two ends of each of the coils pass through the bonnets and are adapted to receive nuts 9 which, when screwed thereon, draw the coils firmly into place against the interior walls of the casing. The coils may conveniently be made of about the same diameter as the rotor, so that they may project into the ends of the shell formed by the stator winding, thereby permitting relatively large coils to be used without increasing the length of the motor.

10 and 11 are pipes, either of which may be the inlet and the other the outlet; these pipes being adapted to lead from a point adjacent the motor to a point above the water in which the motor is adapted to be submerged. The corresponding ends of the coils are connected to these pipes in parallel with each other by means of connections 12 and 13.

It will be seen that the coils present a relatively large cooling surface, and, by making the walls of the tubing of which the coils are made, fairly thin, and maintaining a continuous flow of cool fluid through the coils, a large amount of heat may be conducted away from the interior of the motor. In order to make the cooling action of the coils more effective, I prefer to place a fan 14 at either or both ends of the rotor. Thus, when the motor is set in operation, the air within the casing is set in motion and, in passing over the heated parts of the motor and then across the cool surface of the coils, it conveys the heat generated in the motor to the coils where it is dissipated in the cooling fluid which flows through the coils.

15 is a conduit through which the leads 16 pass into the motor, and 17 is a further conduit through which air may be forced into the motor so as to maintain a static pressure within the casing to compensate for the pressure of the water on the outside.

While the arrangement illustrated is particularly applicable to submergible motors, it may, of course, be used to advantage in any situation where the motor is not submerged but where it is desired to have communication closed between the interior of the casing and the surrounding medium.

It will of course be understood that while the arrangement of parts illustrated and described in detail forms a preferred embodiment of my invention, the invention is not limited to this particular embodiment but, in its broader aspects, may take other forms as will be apparent from the definitions of the invention set forth in the appended claims.

What I claim as new, and desire to secure by Letters Patent of the United States, is,—

1. In a motor, a stator or field ring, bonnets secured to the ends of said ring, a rotor or armature mounted in bearings in said bonnets, and a tubular coil for receiving a cooling fluid nested within one of said bonnets.

2. In a motor, a stator or field ring, bonnets secured to the ends of said ring, a rotor or armature mounted in bearings in said bonnets, and a tubular coil for receiving a cooling fluid nested within each of said bonnets connected with said bearings.

3. In a motor, a bonnet having a tubular coil for receiving a cooling fluid mounted on its inner side.

4. In a motor, a bonnet having a tubular coil for receiving a cooling fluid detachably secured to and supported on its inner side.

5. In a motor, a bonnet having a tubular helical coil for receiving a cooling fluid supported therefrom on its inner side.

6. In a motor, a bonnet having a bearing, and a tubular helical coil for receiving a cooling fluid, said coil being mounted on the inner side of the bonnet concentric with said bearing.

7. In a motor, a bonnet having a tubular coil for receiving a cooling fluid nested therein and having its ends extending through the bonnet, and nuts on said ends without the bonnet for holding the coil in position.

8. In a motor, a bonnet having a bearing, a helical tubular coil nested therein concentric with said bearing and having its ends passing through the bonnet, and screw-threaded members on said ends without the bonnet for holding the coil in position.

9. In a motor, a stator or field ring, bonnets secured to the ends thereof and forming therewith a closed casing, a rotor or armature mounted in bearings in said bonnets, and helical tubular coils for receiving a cooling fluid nested within said bonnets and concentric with said bearings.

10. In a motor, a stator or field ring, bonnets secured to the ends thereof and forming therewith a closed casing, a rotor or armature mounted in bearings in the bonnets, tubular coils arranged to receive cooling fluid nested within said bonnets, and a fan device on said rotor or armature for creating a circulation of the air within the casing.

11. In a motor, a stator or field ring, bonnets secured to the ends thereof and forming therewith a closed casing, a rotor or armature mounted in bearings in said bonnets, helical tubular coils nested within said bonnet and concentric with said bearings, and a fan device carried by said rotor or armature for creating a circulation of the air within the casing.

12. In a motor, a stator or field ring, bonnets secured to the ends thereof and forming therewith a closed casing, a tubular coil nested within each of said bonnets, and inlet and outlet pipes to which said coils are connected in parallel with each other.

13. In a motor, a stator or field ring, bonnets secured to the ends thereof and forming therewith a closed casing, a rotor mounted in bearings in said bonnets, tubular coils for receiving a cooling fluid nested within said bonnets, and a fan at each end of said rotor for creating a circulation of the air in said casing.

14. In a motor having an inclosed casing, a coil for receiving a cooling fluid arranged within the casing at each end of the rotor or armature member of the motor, and a fan device on the rotor or armature for creating a circulation of the air within the casing.

15. In a motor having an inclosed casing and a rotor member within said casing, a helical tubular coil for receiving a cooling fluid arranged within the casing at each end of the rotor and having its axis coincident with the axis of the rotor, and fan devices on the rotor for creating a circulation of the air within the casing.

16. In a motor having an inclosed casing and a rotor mounted within the casing, a helical tubular coil for receiving a cooling fluid arranged within the casing at each end of the rotor and having its ends extending through and secured to the wall of the casing, and fan devices on the rotor for creating a circulation of the air in the casing.

17. In a motor having an inclosed casing and a rotor mounted within the casing, an annular hollow member for receiving a cooling fluid nested within the casing at each end of the rotor, and fan devices on the rotor for creating a circulation of the air within the casing.

In witness whereof, I have hereunto set my hand this thirteenth day of October, 1906.

JOHN B. WIARD.

Witnesses:
JOHN A. McMANUS, Jr.,
PHILIP F. HARRINGTON.